(12) United States Patent
Kim et al.

(10) Patent No.: US 10,874,130 B2
(45) Date of Patent: Dec. 29, 2020

(54) STEVIOL GLYCOSIDE SOLUTIONS

(71) Applicant: PureCircle USA Inc., Oak Brook, IL (US)

(72) Inventors: Grace Kim, Willowbrook, IL (US); Marquita L. Johnson, Oak Lawn, IL (US); Avetik Markosyan, Yerevan (AM); John Martin, Chicago, IL (US); Kian Pin Tan, Johor (MY)

(73) Assignee: PURE CIRCLE USA Inc., Chicago, IL (US)

( * ) Notice: Subject to any disclaimer, the term of this patent is extended or adjusted under 35 U.S.C. 154(b) by 155 days.

(21) Appl. No.: 15/753,351

(22) PCT Filed: Aug. 18, 2016

(86) PCT No.: PCT/US2016/047525
§ 371 (c)(1),
(2) Date: Feb. 19, 2018

(87) PCT Pub. No.: WO2017/031301
PCT Pub. Date: Feb. 23, 2017

(65) Prior Publication Data
US 2018/0235264 A1    Aug. 23, 2018

Related U.S. Application Data

(60) Provisional application No. 62/206,756, filed on Aug. 18, 2015.

(51) Int. Cl.
*A23L 27/30* (2016.01)
*A23L 2/60* (2006.01)

(52) U.S. Cl.
CPC ............... *A23L 27/36* (2016.08); *A23L 2/60* (2013.01); *A23V 2002/00* (2013.01)

(58) Field of Classification Search
CPC ........... A23L 27/36; A23L 27/00; A23L 27/30
USPC ........................................................ 426/658
See application file for complete search history.

(56) References Cited

U.S. PATENT DOCUMENTS

| | | | |
|---|---|---|---|
| 2011/0033525 A1* | 2/2011 | Liu | A61K 31/337 424/450 |
| 2013/0209658 A1* | 8/2013 | Spelman | A23L 27/30 426/658 |
| 2014/0142201 A1† | 5/2014 | Markosyan | |
| 2015/0017284 A1* | 1/2015 | Prakash | A23L 2/60 426/61 |

\* cited by examiner
† cited by third party

*Primary Examiner* — Jyoti Chawla
(74) *Attorney, Agent, or Firm* — Jacqueline Cohen; Jason Grauch; Rachael Casey

(57) ABSTRACT

Steviol glycoside solutions, and methods of making steviol glycoside solutions, are described. The steviol glycoside solutions are clear and stable, and have clear solution stability, for extended periods of time.

9 Claims, No Drawings

STEVIOL GLYCOSIDE SOLUTIONS

BACKGROUND OF THE INVENTION

The invention is directed to a process for producing a stable steviol glycoside solution which can be used as a sweetener, flavor, flavor enhancer, and the like, in food, beverage and other products.

Sugar alternatives are receiving increasing attention due to awareness of many diseases in conjunction with consumption of high-sugar foods and beverages. However, many artificial sweeteners such as dulcin, sodium cyclamate and saccharin were banned or restricted in some countries due to concerns on their safety. Therefore non-caloric sweeteners of natural origin are becoming increasingly popular. The sweet herb *Stevia rebaudiana* produces a number of diterpene glycosides which feature high intensity sweetness and sensory properties superior to those of many other high potency sweeteners.

The above-mentioned sweet glycosides, have a common aglycon, steviol, and differ by the number and type of carbohydrate residues at the C13 and C19 positions. The leaves of *Stevia* are able to accumulate up to 10-20% (on dry weight basis) steviol glycosides. The major glycosides found in *Stevia* leaves are rebaudioside A (2-10%), stevioside (2-10%), and rebaudioside C (1-2%). Other glycosides such as rebaudioside B, D, E, and F, steviolbioside and rubusoside are found at much lower levels (approx. 0-0.2%).

Two major glycosides stevioside and rebaudioside A (reb A), have been extensively studied and characterized in terms of their suitability as commercial high intensity sweeteners. Stability studies in carbonated beverages confirmed their heat and pH stability (Chang S. S., Cook, J. M. (1983) Stability studies of stevioside and rebaudioside A in carbonated beverages. J. Agric. Food Chem. 31: 409-412.)

Steviol glycosides differ from each other not only by molecular structure, but also by their taste properties. Usually stevioside is found to be 110-270 times sweeter than sucrose, rebaudioside A between 150 and 320 times, and rebaudioside C between 40-60 times sweeter than sucrose. Dulcoside A is 30 times sweeter than sucrose. Rebaudioside A has the least astringent, the least bitter, and the least persistent aftertaste thus possessing the most favorable sensory attributes in major steviol glycosides (Tanaka O. (1987) Improvement of taste of natural sweeteners. Pure Appl. Chem. 69:675-683; Phillips K. C. (1989) *Stevia*: steps in developing a new sweetener. In: Grenby T. H. ed. Developments in sweeteners, vol. 3. Elsevier Applied Science, London. 1-43.)

Methods for the extraction and purification of sweet glycosides from the *Stevia rebaudiana* plant using water or organic solvents are described in, for example, U.S. Pat. Nos. 4,361,697; 4,082,858; 4,892,938; 5,972,120; 5,962,678; 7,838,044 and 7,862,845, each of which is incorporated by reference herein in its entirety.

In addition to extracted and purified sweet glycosides, modified steviol glycosides are often used due to the enhanced functional and organoleptic properties achieved by the modification.

Despite the benefits of using steviol glycosides and their modified forms, solubility and clear solution stability of steviol glycosides remain as issues with using steviol glycosides in consumer food and beverage products, particularly in those products that are made on a commercial scale. *Stevia*-derived ingredients, particularly those with higher purity levels, face solubility challenges in aqueous solutions. While crude *stevia* leaf extracts may be water soluble, when the steviol glycosides from the leaf extract are purified, the steviol glycosides become difficult to solubilize and maintain in solution. Purified steviol glycoside extracts have water solubility values that typically range from 0.05% to 1% (w/w) at room temperature, and are difficult to maintain in clear solution form for extended periods of time.

Commercial food and beverage production typically requires the use of stable ingredients that are able to be delivered in various forms which are able to withstand variations in temperature, force, chemical interactions with other ingredients, and the like.

There is a need, therefore, to provide a steviol glycoside solution that can be used in liquid form and remain stable over time and under various conditions.

SUMMARY OF THE INVENTION

The present invention is directed to overcoming the issues with using steviol glycosides in liquid form. The invention describes a process for producing a stable, clear liquid steviol glycoside ingredient that can be used in various food products and beverages as a sweetener, a sweetness enhancer, a flavor, and/or a flavor modifier.

The process of the invention includes the steps of providing a steviol glycoside, combining it with a polyol, such as propylene glycol, optionally heating the combination with agitation, and then cooling the combination to result in the liquid steviol glycoside ingredient. The liquid steviol glycoside ingredient is a clear solution that is stable for an extended period of time under varying conditions. In certain embodiments, the liquid steviol glycoside ingredient is a visibly clear solution that is stable for at least 45 days.

The liquid steviol glycoside ingredient comprises steviol glycosides found in the *Stevia rebaudiana* plant. The steviol glycosides are selected from the group that includes stevioside, any rebaudioside such as rebaudioside A, rebaudioside B, rebaudioside C, rebaudioside D, rebaudioside E, rebaudioside F, rebaudioside I, rebaudioside M, rebaudioside N, rebaudioside O, dulcoside A, steviolbioside, rubusoside, as well as other steviol glycosides found in the *Stevia rebaudiana* plant, and mixtures thereof. In one embodiment, the steviol glycosides are highly purified steviol glycosides having a purity of greater than, for example, 90%, 95%, 97% or 99%. Non-limiting examples of highly purified steviol glycosides include highly purified rebaudioside A and highly purified rebaudioside D. Processes for purifying steviol glycosides is described in U.S. Pat. Nos. 7,862,845, 8,293,302, and 8,377,927, each of which is incorporated by reference herein in its entirety.

In other embodiments, the steviol glycosides may be used in the form of a *stevia* extract comprising a mixture of steviol glycosides. The extract may be taken from any step of the aqueous extraction process, for example, as described in U.S. Pat. No. 7,838,044. The extract may contain a near-native ratio of steviol glycosides as found in the plant, or may be subjected to intermediate extraction and/or purification steps to provide a desired concentration and ratio of steviol glycosides. In certain embodiments, desired concentrations of certain steviol glycosides, such as rebaudioside A, rebaudioside B, rebaudioside D, etc. are present in the *stevia* extract.

The liquid steviol glycoside ingredient may additionally or alternatively comprise modified steviol glycosides, such as glucosylated steviol glycosides. Glucosylated steviol glycosides have one or more glucose units attached to the C-13 and/or the C-19 position of the steviol glycoside structure. In certain embodiments, 1 to 2 glucose units are added. In other embodiments, 3 to 9, or 10 to 20, or some combination thereof, of glucose units are added to the steviol glycosides. Some methods for glycosylating steviol glycosides are described in U.S. Pat. Nos. 8,257,948, 8,318,232, 8,318,459, 8,323,716, 8,501,261, 8,669,077, 8,735,101, 8,911,971, 8,993,269 and 9,055,761, each of which is incorporated by reference herein it its entirety. Glucosylated steviol glycosides have been found to impact the sweetness and/or the flavor profile of the products to which they are added.

In one embodiment, the steviol glycoside is first subjected to a gradient heating process to enhance its solubility. The solubility of the steviol glycoside can be also enhanced by using a gradient cooling process after the gradient heating process. Examples of such gradient heating and gradient cooling processes are described in U.S. Pat. No. 8,993,028, and US Patent Application Publication No. 20130330463, each of which is incorporated by reference herein in its entirety.

The obtained liquid steviol glycoside ingredient may be applied in various foods and beverages as sweeteners, sweetness enhancers, flavor enhancers, and flavor modifiers, including soft drinks, liquid beverage enhancers, non-carbonated beverages, ice cream, cookies, bread, fruit juices, milk or dairy products, baked goods and confectionary products.

It is to be understood that both the foregoing general description and the following detailed description are exemplary and explanatory and are intended to provide further explanation of the invention as claimed.

DETAILED DESCRIPTION OF THE INVENTION

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The solubility and clear solution stability of steviol glycoside ingredients has impacted their use in systems in which either solubility, or clear solution stability, or both, are important factors. Typical steviol glycoside ingredients have water solubility levels ranging from less than 0.01% to about 2% at room temperature. Even if a steviol glycoside ingredient has a suitable solubility, the stability of the resulting solution is often for a short period of time, often ranging from a few minutes to a few hours, making it difficult to use such solutions in commercial production processes.

As used herein, the term "solubility" shall be defined as the ability of a steviol glycoside to form a visibly clear solution. The expression "clear solution stability" shall be defined as the time period over which the steviol glycoside solution remains clear. "Clear" as used herein shall be defined as visibly clear, and free of visible precipitation or turbidity. The use of the expression "steviol glycosides" shall include any steviol glycoside, combinations of steviol glycosides, and modified forms of steviol glycosides.

Steviol glycoside ingredients can be used in highly purified forms, or in blends that provide functional and organoleptic advantages. Blends may include two or more steviol glycosides or modified steviol glycosides, in various ratios depending on the desired result. In some blends, one steviol glycoside may form the majority of the blend, or the steviol glycosides may be present in approximately equal amounts in the blend. Other forms of steviol glycoside ingredients include extracts, which may be minimally processed to remove most of the plant impurities, or moderately or highly processed to increase the concentration of desired steviol glycosides in the extract.

In one embodiment, it was surprisingly discovered that using propylene glycol, or other polyols, to solubilize steviol glycoside ingredients, and particularly steviol glycoside blends, provides solubility and clear solution stability to the resulting solution. The propylene glycol is provided in an aqueous solution in a concentration ranging from about 10-50% w/w (propylene glycol to water.) The steviol glycoside, whether a purified form or a blend, is added to the propylene glycol, which is optionally first heated to a temperature of between about 70° C. to about 90° C., or about 75° C. to about 85° C. In certain embodiments, the propylene glycol is first heated to a temperature of about 80° C. Upon adding the steviol glycoside ingredient to the propylene glycol or the heated propylene glycol, the mixture is agitated continuously until the steviol glycoside is completely dissolved. The resulting solution is visibly clear, and has a clarity that is similar, substantially equivalent, or equivalent to the clarity of pure water.

In another embodiment, it was surprisingly discovered that propylene glycol in an essentially water-free system is able to solubilize steviol glycoside ingredients, particularly steviol glycoside extracts, and results in a highly concentrated steviol glycoside ingredient solution, and provides superior solubility and clear solution stability to the resulting solution. As used herein, the expression "essentially water-free system" means that no quantifiable amount of water is added to the system, and any water present in the system is merely a trace amount that may be inherently contained in the components of the solution.

If the propylene glycol or other polyol was heated, the liquid steviol glycoside ingredient solution is then cooled to room temperature of about 20° C. to 25° C. for further use. The resulting solution remains clear for an extended period of time, ranging from 1 week to over 1 month.

It was unexpectedly discovered that relatively high concentration steviol glycoside ingredient solutions can be prepared with this method, with concentrations ranging from about 5% to 40% by weight, as compared to conventional solubility levels as described above. This represents an approximately 2.5 to 4000 times increase in solubility as compared to aqueous solutions of the same steviol glycoside ingredient. In some embodiments, a solubility increase of 2000 times the aqueous solubility of the same steviol glycoside ingredient was observed. Even at these high concentrations, the steviol glycoside ingredient solutions remained clear over time.

The following Examples are intended to enable and exemplify, and not limit, the invention, the full scope of which is defined in the appended claims.

Comparative Example 1: Tabletop Steviol Glycoside Sweetener

A commercially available tabletop steviol glycoside sweetener was evaluated for its solubility in water and in propylene glycol, based on the instructions provided at (website.)

3 g of the tabletop sweetener was mixed with 9 ml of propylene glycol, resulting in a 30% mixture. The mixture was microwaved, shaken by hand, and cooled, and the process repeated 6 times. The mixture formed a highly viscous, gritty, opaque paste.

Comparative Example 2: Commercially Available Highly Purified *Stevia* Ingredient Reb A 97, available from Tereos PureCircle Solutions (www.stevia-tereos-purecircle.com), was combined with propylene glycol in the same manner as Comparative Example 1. A similar viscous, gritty, opaque paste was formed.

Example 1: Blend of Steviol Glycoside Ingredients

A blend of three commercially available steviol glycoside ingredients was prepared, as follows:

TABLE 1A

| Steviol Glycoside Ingredient | Amount (% w/w) |
|---|---|
| Reb A + Stevioside | ≥75 |
| Reb C + Stevioside | ≥8 |
| Total steviol glycosides | ≥95 |

A series of propylene glycol solutions was prepared, and each one was heated to about 80° C. The steviol glycoside blend was added to the propylene glycol solution at various concentrations, under constant agitation and while maintaining the temperature of the solution at about 80° C. The time to form a clear steviol glycoside solution was measured. The resulting steviol glycoside ingredient solutions were allowed to cool, then each solution was divided into two samples, with one sample being held at room temperature (about 20° C.) while the other sample was stored under refrigeration at a temperature of about 4° C. The clear solution stability of the steviol glycoside ingredient solution was measured over 60 days. The results are shown in Table 1B.

TABLE 1B

|  | % Stevia | | | | | |
|---|---|---|---|---|---|---|
|  | 5% | 10% | 20% | 25% | 30% | 40% |
| Blend I | 10 g | 20 g | 40 g | 50 g | 60 g | 80 g |
| Propylene Glycol | 100 g | 100 g | 80 g | 75 g | 70 g | 60 g |
| Water | 90 g | 80 g | 80 g | 75 g | 70 g | 60 g |
| Total | 200 g | 200 g | 200 g | 200 g | 200 g | 200 g |
| Stability at Room Temperature for 60 Days | Clear | Clear | Clear | Clear | Slightly cloudy | Slightly cloudy |
| Stability at Refrigeration Temperature for 60 Days | Clear | Clear | Clear | Clear | Slightly cloudy | Slightly cloudy |

Example 2: Solubility of Various *Stevia* Sweeteners in 50:50 Ratio of Propylene Glycol and Water A solution of 50% propylene glycol and 50% water was heated to about 80° C. Each *stevia* blend was tested at various concentrations to determine the maximum solubility of products. The steviol glycoside blend was added to the propylene glycol solution at various concentrations, under constant agitation and while maintaining the temperature of the solution at about 80° C. The time to form a clear steviol glycoside solution was measured. The resulting steviol glycoside ingredient solutions were allowed to cool, then each solution was divided into two samples, with one sample being held at room temperature (about 20° C.) while the other sample was stored under refrigeration at a temperature of about 4° C. The clear solution stability of the steviol glycoside ingredient solution was measured over 60 days. The blend compositions are shown in Table 2A, and the solubility and clarity results are shown in Table 2B.

TABLE 2A

| Sample | Stevia Blend | Total Steviol Glycosides (%) |
|---|---|---|
| 1 | Rebaudioside A ≥50% | ≥95% |
| 2 | Rebaudioside A ≥97% | ≥95% |
| 3 | Rebaudioside A ≥99% | ≥95% |
| 4 | Rebaudioside B | ≥95% |
| 5 | Rebaudioside A ≥70% | ≥95% |
| 6 | Rebaudioside D ≥50% | ≥95% |

TABLE 2B

| Sample | Comments |
|---|---|
| 1 | 20% w/w clear and stable over 1 month |
| 2 | 20% w/w clear and stable over 1 week, solid at 1 month |
| 3 | Did not dissolve |
| 4 | 20% w/w went solid within 30 minutes |
| 5 | 20% w/w clear and stable for 1 week, semi-solid paste at over 1 month |
| 6 | Tried at 10% w/w, formed an insoluble paste |

Liquid Beverage Enhancers

Liquid beverage enhancers, commonly referred to as "drops," have become quite popular for flavoring, sweetening, coloring, or enhancing beverages, such as water, tea, coffee, or other aqueous beverages. These beverage enhancers are typically clear solutions and generally comprise a high concentration of a sweetener dissolved in water. The high concentration is required in order for just one or a few drops of the enhancer to sweeten, flavor, or otherwise enhance a standard serving of a beverage, such as 8, 16 or 24 ounces of the beverage.

Consumers expect these enhancers to be clear and free from visible crystals or cloudiness during the shelf life of these enhancers. Other enhancers, such as some coffee enhancers, need not necessarily be clear, but can resemble milk or cream and are desirably smooth and flowable in their consistency without crystals or granules in the enhancer.

It was unexpectedly discovered that by using an essentially water-free system, liquid beverage enhancers using only *stevia*-based ingredients as the sweetener can be prepared, and remain clear and stable over the desired shelf life of the enhancer. In certain embodiments, the *stevia*-based ingredients are present in an amount ranging from 5-10% w/w, such as 8% or 9% by weight. In one embodiment, the essentially water-free system comprises food-grade propylene glycol. Other food-grade polyols include glycerol, sorbitol and mannitol.

Example 3: Liquid Beverage Enhancer

A liquid beverage enhancer was made using the formula listed in Table 3.

TABLE 3

| Ingredient | Amount |
| --- | --- |
| Propylene Glycol | 34.25 ml |
| Stevia Extract | 3 g |
| Malic Acid | 10 g |
| Potassium Sorbate | 0.5 g |
| Potassium Citrate | 1.25 g |
| Flavor | 0.825 g |

The liquid beverage enhancer was prepared using the following procedure. A measured volume of propylene glycol was heated and maintained at 80° C., then malic acid was added, sonicated and periodically vortexed to dissolve the malic acid in the propylene glycol. The *stevia* extract powder was then added and dissolved, followed by adding the potassium sorbate which also was dissolved. Potassium citrate was added, sonicated and periodically vortexed until the potassium citrate was also dissolved. The solution was then cooled down to room temperature, and the flavor was added and mixed well to form the liquid beverage enhancer.

The sequence of steps described above may be changed, with some steps omitted, or otherwise altered, to produce the liquid beverage enhancer.

It is to be understood that the foregoing descriptions and specific embodiments shown herein are merely illustrative of the best mode of the invention and the principles thereof, and that modifications and additions may be made by those skilled in the art without departing from the spirit of the invention, the full scope of which is defined by the appended claims.

What is claimed is:

1. A method of making a stable, clear liquid steviol glycoside ingredient solution, comprising the steps of:
   a. providing a steviol glycoside;
   b. providing a solvent system comprising 10-100% w/w propylene glycol; and
   c. combining the steviol glycoside in the solvent with constant agitation and while maintaining the temperature of the solvent until the steviol glycoside is dissolved to provide a stable, clear liquid steviol glycoside ingredient solution having a steviol glycoside concentration of from about 5% to about 40% w/w;
   wherein the stable, clear liquid steviol glycoside ingredient solution has a clear solution stability at a steviol glycoside concentration of up to 40% w/w for 45-60 days.

2. The method of claim 1, wherein the steviol glycoside is made by a gradient beating and gradient cooling process.

3. The method of claim 1, wherein the propylene glycol is 10-50% w/w.

4. The method of claim 1, wherein the solvent system is heated prior to combining the steviol glycosides in the solvent.

5. The method of claim 4, wherein the solvent system is heated to a temperature of about 70° C. to about 95° C.

6. The method of claim 1, wherein the steviol glycoside ingredient solution is cooled after dissolving the steviol glycoside.

7. The method of claim 6, wherein the steviol glycoside ingredient solution is cooled to about 20° C.

8. The method of claim 1, wherein the steviol glycoside ingredient solution is visibly clear and free of visible cloudiness or turbidity.

9. The method of claim 1, wherein the steviol glycoside is selected from one or more of the following: Reb A, Reb B, Reb C, Reb D, Reb E, Reb F, Reb I, Reb M, Reb N, Reb O, Reb Q, Reb R, Dulcoside A, Rubusoside, Stevioside, Steviolbioside, and combinations thereof.

* * * * *